US010618419B2

(12) United States Patent
Gruber et al.

(10) Patent No.: US 10,618,419 B2
(45) Date of Patent: Apr. 14, 2020

(54) ENERGY STORAGE ARRANGEMENT COMPRISING MULTIPLE ENERGY STORES

(71) Applicant: Bayerische Motoren Werke Aktiengesellschaft, Munich (DE)

(72) Inventors: Dominik Gruber, Roefingen (DE); Joerg Reuss, Unterschleissheim (DE); Thomas Schimanek, Woerthsee (DE); Andre Schmitz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/040,619

(22) Filed: Jul. 20, 2018

(65) Prior Publication Data

US 2018/0326858 A1    Nov. 15, 2018

Related U.S. Application Data

(63) Continuation of application No. PCT/EP2017/050792, filed on Jan. 16, 2017.

(30) Foreign Application Priority Data

Jan. 21, 2016   (DE) .......................... 10 2016 200 769

(51) Int. Cl.
*B60L 58/19*     (2019.01)
*B60L 11/18*    (2006.01)
(Continued)

(52) U.S. Cl.
CPC ........... *B60L 11/1855* (2013.01); *B60L 58/19* (2019.02); *H02J 7/0024* (2013.01); *H02J 7/1423* (2013.01);
(Continued)

(58) Field of Classification Search
CPC ...... B60L 11/1855; B60L 58/19; H02P 27/06; H02J 7/0024
(Continued)

(56) References Cited

U.S. PATENT DOCUMENTS 9,266,482 B2 *   2/2016   Proebstle ................ B60R 16/03
2004/0130214 A1 *   7/2004   Murty ................... H02J 7/1423
                                                  307/66
(Continued)

FOREIGN PATENT DOCUMENTS

DE   20 2008 017 499 U1    11/2009
DE   20 2009 017 862 U1     8/2010
(Continued)

OTHER PUBLICATIONS

International Search Report (PCT/ISA/210) issued in PCT Application No. PCT/EP2017/050792 dated Apr. 20, 2017 with English translation (four (4) pages).
(Continued)

*Primary Examiner* — Kawing Chan
(74) *Attorney, Agent, or Firm* — Crowell & Moring LLP

(57) ABSTRACT

A current source arrangement includes a first current source having a first terminal and a second terminal; a second current source having a first terminal and a second terminal; and a DC/DC converter having a first terminal pair and a second terminal pair. The DC/DC converter is designed to convert a first direct voltage applied at the first terminal pair into a direct voltage output at the second terminal pair, and/or to convert a first direct voltage applied at the second terminal pair into a direct voltage output at the first terminal pair. The first terminal pair of the DC/DC converter is connected in parallel to the first current source, wherein the second terminal pair of the DC/DC converter is connected in series to the second current source. The second terminal pair of the DC/DC converter and the second current source are connected in parallel to the first current source.

7 Claims, 3 Drawing Sheets

(51) Int. Cl.
*H02J 7/14* (2006.01)
*H02J 7/00* (2006.01)
*H02P 27/06* (2006.01)

(52) U.S. Cl.
CPC ........... *H02P 27/06* (2013.01); *B60L 2210/10* (2013.01); *B60L 2210/40* (2013.01); *B60Y 2200/91* (2013.01); *Y02T 10/705* (2013.01); *Y02T 10/7005* (2013.01)

(58) Field of Classification Search
USPC ........................................................ 318/139
See application file for complete search history.

(56) References Cited

U.S. PATENT DOCUMENTS

| | | |
|---|---|---|
| 2007/0018607 A1 | 1/2007 | Kurosawa |
| 2014/0265605 A1 | 9/2014 | Ishigaki et al. |
| 2014/0354058 A1 | 12/2014 | Guo et al. |

FOREIGN PATENT DOCUMENTS

| | | |
|---|---|---|
| DE | 10 2012 017 461 A1 | 3/2014 |
| DE | 10 2013 209 069 A1 | 11/2014 |
| DE | 10 2015 202 975 A1 | 8/2016 |
| EP | 0 923 183 A2 | 6/1999 |
| WO | WO 2014/079994 A2 | 5/2014 |

OTHER PUBLICATIONS

German-language Written Opinion (PCT/ISA/237) issued in PCT Application No. PCT/EP2017/050792 dated Apr. 20, 2017 (six (6) pages).

German-language Search Report issued in counterpart German Application No. 102016200769.6 dated Jun. 24, 2016 with partial English translation (eleven (11) pages).

\* cited by examiner

ENERGY STORAGE ARRANGEMENT COMPRISING MULTIPLE ENERGY STORES

CROSS REFERENCE TO RELATED APPLICATIONS

This application is a continuation of PCT International Application No. PCT/EP2017/050792, filed Jan. 16, 2017, which claims priority under 35 U.S.C. § 119 from German Patent Application No. 10 2016 200 769.6, filed Jan. 21, 2016, the entire disclosures of which are herein expressly incorporated by reference.

BACKGROUND AND SUMMARY OF THE INVENTION

The present invention relates to an improved current source arrangement having a plurality of current sources. A current source can be optimized for a high capacitance. A different current source can be optimized for a high power output.

The present invention relates, in particular, to an improved current source arrangement for an electrically driven vehicle.

For the purpose of power scaling in electrochemical energy stores in a vehicle, capacitance-optimized rechargeable battery cells and power-optimized rechargeable battery cells or double-layer capacitors are installed in mixed fashion in a rechargeable battery arrangement, which is also referred to in the prior art as a dual store. Generally, a string or a plurality of strings of capacitance-optimized cells are connected in parallel with a string or a plurality of strings having power-optimized cells. The strings are generally coupled by means of a DC/DC converter, which is connected in parallel with the strings. The DC/DC converter balances different voltages between the strings.

DE 20 2009 017 862 U1 and DE 20 2008 017 499 U1 describe parallel circuits of batteries.

DE 10 2013 209 069 A1 discloses a battery assembly having high-energy cells and high-power cells.

A disadvantage of the prior art is that the DC/DC converter has to be designed for the maximum peak power of the coupled string of rechargeable battery cells. A DC/DC converter of this kind is complex, requires a relatively large amount of installation space, gives rise to high costs and causes a high power loss.

DE 10 2015 202 975.1, the entire disclosure of which is hereby incorporated by reference herein, describes a rechargeable battery arrangement having a DC/DC converter having first rechargeable battery cells connected in parallel, wherein the DC/DC converter is connected in series with second rechargeable battery cells.

The invention addresses the object of providing an improved current source arrangement that has a plurality of current sources.

The object of the invention is achieved by a current source arrangement, by an electric drive and by a method for supplying power, in accordance with embodiments of the invention.

A current source arrangement according to the invention comprises a first current source having a first terminal and a second terminal, a second current source having a first terminal and a second terminal, and a DC/DC converter. The DC/DC converter has a first terminal pair and a second terminal pair. The DC/DC converter is configured to convert a first DC voltage applied to the first terminal pair to a DC voltage output at the second terminal pair. The DC/DC converter can be configured to convert a first DC voltage applied to the second terminal pair to a DC voltage output at the first terminal pair. The first terminal pair of the DC/DC converter is connected in parallel with the first current source, and the second terminal pair of the DC/DC converter is connected in series with the second current source. The second terminal pair of the DC/DC converter and the second current source are connected in parallel with the first current source.

In the current source arrangement according to the invention, the DC/DC converter does not have to convert all of the power that is output by a current source. Said DC/DC converter can therefore be designed in a substantially simpler manner, as a result of which installation space, weight, outlay and power loss are reduced. The performance of the current source arrangement according to the invention is also increased. The first current source can be set up to have a higher output voltage than the second current source. In the current source arrangement according to the invention, the DC/DC converter can be operated in such a way that the two current sources output current to a load in parallel. This operating situation is desirable when it is intended for an electric drive to generate a high torque. The current source arrangement according to the invention can be operated in another operating situation in such a way that the voltage of the first current source and the voltage of the second current source are connected in series by way of the DC/DC converter. This mode of operation may be desirable, for example, when an electric drive is operated at a high rotational speed.

A first terminal of the first terminal pair and a first terminal of the second terminal pair of the DC/DC converter can have the same potential. As a result, the voltages at the first terminal pair of the DC/DC converter, at the second terminal pair of the DC/DC converter and at the first terminal of the first current source are set to the same reference potential.

The first terminal of the first current source can be coupled to the first terminal of the first terminal pair of the DC/DC converter and to the first terminal of the second terminal pair of the DC/DC converter. The second terminal of the first current source can be coupled to the second terminal of the second current source and to the second terminal of the first terminal pair of the DC/DC converter.

The current source arrangement can have a first terminal and a second terminal. A load, for example an inverter that supplies power to an electric machine, can be connected to the first terminal and the second terminal of the current source arrangement. The first terminal of the first current source can be coupled to the first terminal of the current source arrangement. The second terminal of the first current source can be coupled to the second terminal of the current source arrangement by way of a first switch. The second terminal of the second current source can be coupled to the second terminal of the current source arrangement by way of a second switch. The first and the second switch may be a so-called contactor.

Depending on the desired operating state, the first and the second switch can be connected in such a way that the current in the arrangement flows from the two current sources and the DC/DC converter in the desired manner. When the current source arrangement is charged, the first switch and the second switch can also be connected in such a way that the current sources are charged properly.

The current source arrangement according to the invention can have a first charging terminal, which is coupled to the first terminal of the second terminal pair of the DC/DC converter, and a second charging terminal, which is coupled to the second terminal of the second current source. As a result, the charging current for the first current source can be set by means of the DC/DC converter.

The first current source and/or the second current source can have a rechargeable battery optimized for a high capacitance, a rechargeable battery optimized for a high current output, a capacitor, a supercapacitor, a series circuit of rechargeable battery cells, a series circuit of rechargeable battery cells optimized for a high capacitance, a series circuit of rechargeable battery cells optimized for a high current output and/or a fuel cell. In one embodiment, the first current source can be a series circuit of rechargeable battery cells optimized for a high capacitance and/or a rechargeable battery optimized for a high capacitance. The second current source can be a series circuit of rechargeable battery cells optimized for a high current output and/or a rechargeable battery optimized for a high current output.

The current source arrangement can have a control device. The control device can be configured to actuate the DC/DC converter, the first switch and the second switch in such a way that the first switch and the second switch are closed. The control device can actuate the DC/DC converter in such a way that a current flows through the first current source and through a load connected to the terminals of the current source arrangement. The DC/DC converter is furthermore actuated in such a way that a current flows through the first current source and through the first terminal pair of the DC/DC converter. In this first operating situation, the DC/DC converter is actuated in such a way that a current flows through the second current source and through the second terminal pair of the DC/DC converter and through the load connected to the terminal pair of the current source arrangement. The current of the first current source furthermore flows to the load connected to the terminal pair of the current source arrangement. In this first operating situation, the DC/DC converter can be operated by means of current regulation, wherein the current at the second terminal pair of the DC/DC converter regulates the load distribution between the two current sources.

The difference between the voltage of the first current source and the second current source can be applied across the second terminal pair of the DC/DC converter. In this operating situation, the voltage of the first current source can be applied at the load, said voltage being identical to the sum of the voltage of the second current source and the voltage across the second terminal pair of the DC/DC converter. This operating situation can be used, for example, for accelerating an electrically driven vehicle, since, in this operating situation, the electric machine has to generate a high torque, for which reason the inverter requires a high link circuit current.

In a second operating situation, the control device can actuate the first switch and the second switch in such a way that the first switch is open and the second switch is closed. In this operating situation, the DC/DC converter is actuated in such a way that a current flows through the first current source and through the first terminal pair of the DC/DC converter. The DC/DC converter is furthermore actuated in such a way that a current flows through the second current source and through the second terminal pair of the DC/DC converter and through the load connected to the terminals of the current source arrangement.

The voltage at the second terminal pair of the DC/DC converter can be regulated. As a result, a voltage that is higher than the voltage of the first current source can be generated at the terminals of the current source arrangement.

In this embodiment, the sum of the voltage of the second current source and the voltage across the second terminal pair of the DC/DC converter is applied to the terminals of the current source arrangement. The current source arrangement according to the invention can therefore generate a high link circuit voltage, as a result of which the efficiency of the inverter can be increased depending on the operating point of the electric drive. This operating situation may be suitable when the electric machine is operated at a high rotational speed.

In a third operating situation, the control device actuates the first switch and the second switch in such a way that the first switch is open and the second switch is open. The control device actuates the DC/DC converter in such a way that a current flows through the charging terminals and through the second current source and through the second terminal pair of the DC/DC converter. A current therefore flows through the first terminal pair of the DC/DC converter and through the first current source. In this operating situation, the first current source and the second current source can be charged. In this operating situation, the current across the first terminal pair of the DC/DC converter is controlled or regulated. A voltage at the charging terminal of the arrangement that is higher than the voltage of the second current source is furthermore increased as a result. Since the charging power depends linearly on the charging voltage and since the charging current in a charging station is generally limited, the charging power of the current source arrangement increases.

The invention also relates to an electric drive having an electric machine, which is connected to first terminals of an inverter. The electric drive also comprises the current source arrangement described above, which is connected to two terminals of the inverter. The inverter generates from the DC voltage of the current source arrangement an AC signal, for example a three-phase AC signal, which is applied to the electric machine.

The invention also relates to an electrically driven vehicle having the electric drive described above. The electrically driven vehicle can have a hybrid drive, a plug-in hybrid drive or a fully electric drive.

The invention also relates to a method for supplying power to an electrical load. In a first operating situation, the method has the steps of causing a current to flow through a first current source and through the load, the step of causing a current to flow through the first current source and through a first terminal pair of a DC/DC converter and the step of causing a current to flow through a second current source and through a second terminal pair of the DC/DC converter and through the load. This operating situation corresponds to the first operating situation, which has been described above in terminal with the current source arrangement according to the invention. For the sake of conciseness, said operating situation is not described again.

In a second operating situation, the method comprises the step of causing a current to flow through the first current source and through the first terminal pair of the DC/DC converter and the step of causing a current to flow through the second current source and through the second terminal pair of the DC/DC converter and through the load. This operating situation corresponds to the second operating situation described in terminal with the current source arrangement according to the invention. For the sake of conciseness, said operating situation is not described again either.

In a third operating situation, the method can have the step of causing a current to flow from a charging current source through charging terminals and through the second current source and the second terminal pair of the DC/DC converter and the step of causing a current to flow through the first terminal pair of the DC/DC converter and through the first current source. This operating situation serves to charge the first current source and the second current source.

The method can thus be developed further, as has been described above with respect to the current source arrangement.

The invention also relates to a computer program product, which executes the steps described above when it is loaded into a memory of a computer having a processor.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 5:
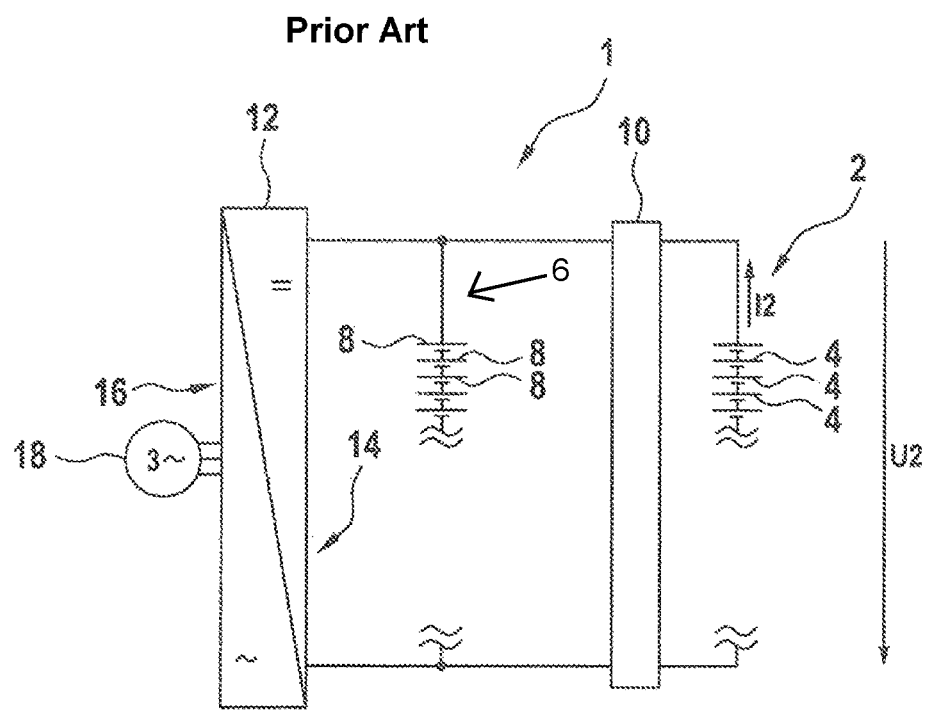
FIG. 5 shows a current source arrangement of the prior art.

FIG. 5 shows a rechargeable battery arrangement 1 of the prior art having output terminals 14, to which an inverter 12 is connected, an electric machine 18 being connected to the AC terminals 16 of said inverter. The rechargeable battery arrangement 1 of the prior art comprises a first series circuit 2 of first charge storage cells 4, for example capacitors, which are designed for a high current output. The first series circuit 2 of first charge storage cells 4 is connected to a DC/DC converter 10, which is connected to a second series circuit 6 of second charge storage cells 8, which are optimized for a high capacitance. The second charge storage cells 8 may be lithium-ion cells, for example. The second series circuit 6 of second charge storage cells 8 forms the link circuit voltage and is connected to the DC-side input 14 of the inverter 12.

The DC/DC converter 10 has to be designed in such a way that it can convert all of the power (P=U·I1) that can be output by the first series circuit 2 of first charge storage cells, as a result of which said DC/DC converter is complex to produce and has a high space requirement.

Figure 1:
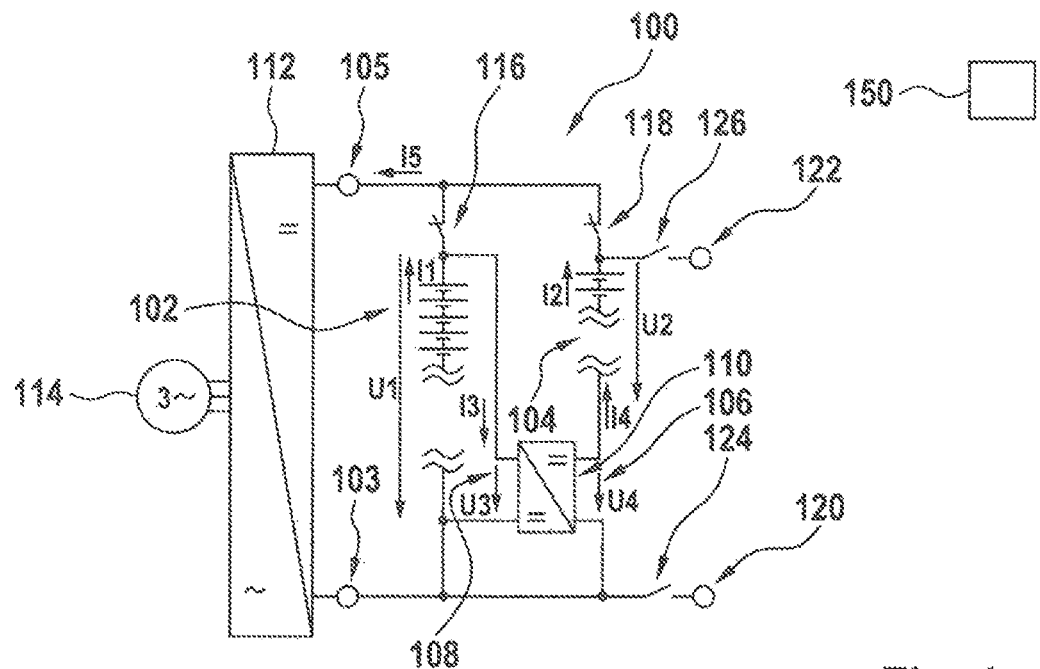
FIG. 1 is a schematic diagram of the operation of the current source arrangement according to an embodiment of the invention in a first operating situation.

Reference is made to FIG. 1, which shows a current source arrangement 100 according to the invention, which is operated in a first operating situation. The current source arrangement 100 according to the invention comprises a first current source 102, the first terminal of which is coupled to the first terminal 103 of the current source arrangement and to the first terminal of a first terminal pair 108 of a DC/DC converter 106. The second terminal of the first current source 102 is coupled to the second terminal 105 of the current source arrangement 100 by means of a first switch 116. The second terminal of the first current source 102 is furthermore coupled to the second terminal of the first terminal pair 108 of the DC/DC converter 106. A first terminal of a second current source 104 is connected to the second terminal of the second terminal pair 110 of the DC/DC converter 106. The first terminal of the second terminal pair 110 of the DC/DC converter 106 is coupled to the first terminal 103 of the current source arrangement 100. The second terminal of the second current source 104 is coupled to the second terminal 105 of the current source arrangement 100 by means of a second switch 118. The first switch 116 and the second switch 118 may each be a so-called contactor.

The first terminal of the second terminal pair 110 of the DC/DC converter 116 is coupled to a first charging terminal 120 by means of a first charging switch 124. The second terminal of the second current source 104 is coupled to the second charging terminal 122 by means of a second switch 126. A control device 150 controls the operation of the first switch 116, the second switch 118, the first charging switch 124, the second charging switch 126 and the DC/DC converter 106.

In the operating situation shown in FIG. 1, the first switch 116 and the second switch 118 are closed. The first charging switch 124 and the second charging switch 126 are open.

The first current source 102 has the voltage U1 and the second current source 104 has the voltage U2. The current I1 flows through the first current source 102 and the current I2 flows through the second current source 104. The voltage U3=U1 is applied at the first terminal pair 108 of the DC/DC converter 106. The voltage U4 is applied at the second terminal pair 110 of the DC/DC converter 106, said voltage corresponding to the difference between the voltage U1 of the first current source 102 and the voltage U2 of the second current source 104.

The current I3 flows through the first terminal pair 108 of the DC/DC converter 106 and the current I4 flows through the second terminal pair 110 of the DC/DC converter.

The DC/DC converter therefore has to be designed for a power P>U4·I4. Since the voltage U4 across the second terminal pair 110 of the DC/DC converter 106 is generally substantially lower than the voltage U2 of the second current source 104, the DC/DC converter 106 can be designed for a significantly lower power. Installation space, weight, outlay, losses and the like can be reduced as a result.

In one example, the voltage of the first current source U1 is 360 V and the current I1 output by the first current source 102 is 400 A. The voltage U2 of the second current source 104 is 300 V. The current I2 output by the second current source 104 is 200 A. The voltage drop across the second terminal pair 110 of the DC/DC converter 106 is therefore 60 V. In the example from the prior art shown in FIG. 5, the voltage U2 of 300 V drops across the DC/DC converter. At this operating point, the DC/DC converter 10 of the prior art (FIG. 5) would therefore have to be designed for a power of P>U2·I2, which in this example corresponds to a power of 60 kW.

In the example shown in FIG. 1, the current I3 through the first terminal pair 108 of the DC/DC converter 106 is 35 A and the voltage U3 is 360 V, which corresponds to a power of P1=12.6 kW. The power output at the second terminal pair 110 is calculated by means of the following formula:

$$P2 = \eta \cdot P1.$$

If the first DC/DC converter has an efficiency $\eta$ of approximately 95%, a power of approximately P=12 kW can be output at the second terminal pair 110 of the DC/DC converter 106, which corresponds to a voltage U4 of approximately 60 V and a current I4 of approximately 200 A.

The current I5 output at the terminals 103, 105 of the current source arrangement 100 is the sum of the current I1 through the first current source 102 and the current I2 output by the second current source 104 minus the current I3. In the example mentioned above, the current I5 is approximately 565 A.

An inverter 112 is connected to the terminals 103, 105 of the current source arrangement 100, said inverter converting the direct current of the current source arrangement 100 to a three-phase alternating current for an electric machine 114. The operation of an inverter 112 and an electric machine 114 to drive a vehicle is known to those skilled in the art and does not have to be explained further here for the sake of conciseness.

The embodiment shown in FIG. 1 has the advantage that the DC/DC converter 106 only has to be designed for a power corresponding at least to the product of the current I2=I4 through the second current source 104 multiplied by the difference between the voltage U1 of the first current source 102 and the voltage U2 of the second current source 104. The DC/DC converter 10 of the prior art in accordance with FIG. 5 has to be designed for a higher power corresponding at least to the product of the voltage U2 of the second current source 2 and the current I2 through the second current source.

Figure 2:
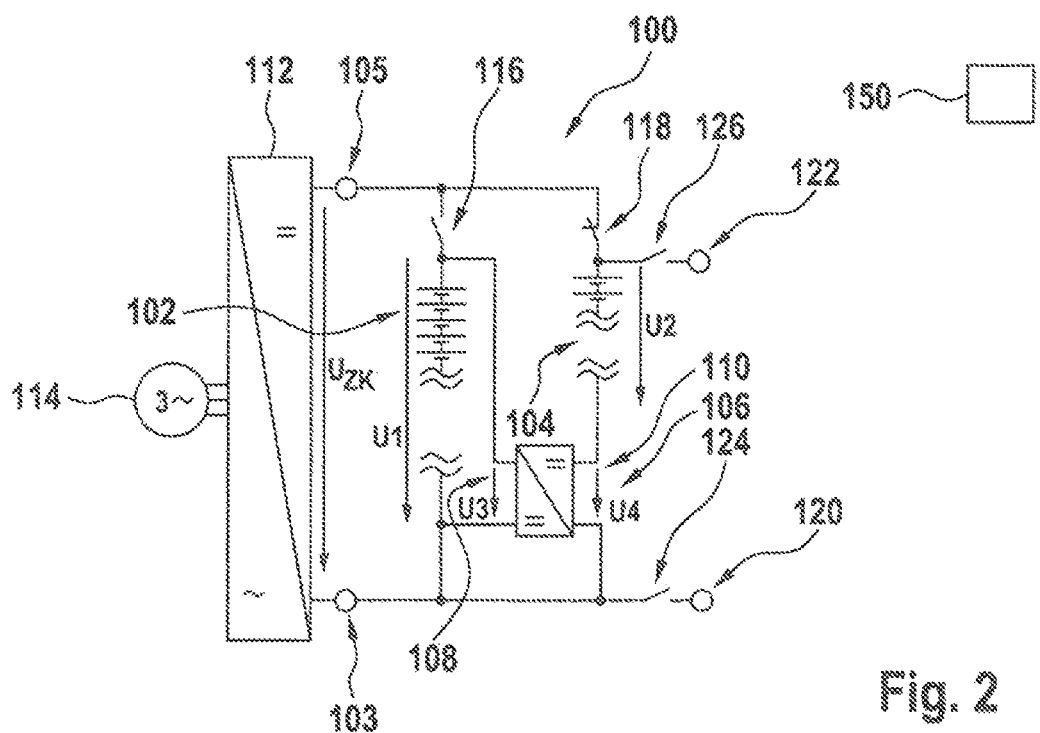
FIG. 2 is a schematic diagram of the operation of the current source arrangement according to an embodiment of the invention in a second operating situation.

Reference is made to FIG. 2, which shows a second operating situation or a second embodiment of the current source arrangement 100 according to the invention.

The structural design of the current source arrangement 100 of FIG. 2 corresponds to that of FIG. 1, such that this is not described again for the sake of conciseness.

In the embodiment shown in FIG. 2, the first switch 116 is open and the second switch 118 is closed. The first charging switch 124 and the second charging switch 126 are open. The voltage U3=U1, which corresponds to the voltage U1 of the first current source 102, is applied at the first terminal pair 108 of the DC/DC converter 106. The DC/DC converter 106 converts the voltage U3 to the voltage U4, wherein the voltage U4 is regulated. The voltage UZK=U2+ U4, that is to say the sum of the voltage U2 of the second current source 104 and the voltage U4 across the second terminal pair 110 of the DC/DC converter 106 as the link circuit voltage, is therefore applied to the terminals 103, 105 of the current source arrangement.

The advantage of the operating situation or embodiment in accordance with FIG. 2 is that a voltage higher than the voltage U1 of the first current source 102 can be supplied to the inverter 112. As a result, the total efficiency can be optimized depending on the operating point of the electric machine 114. This operating situation may be suitable, for example, when the electric machine 114 has a high rotational speed.

Figure 3:
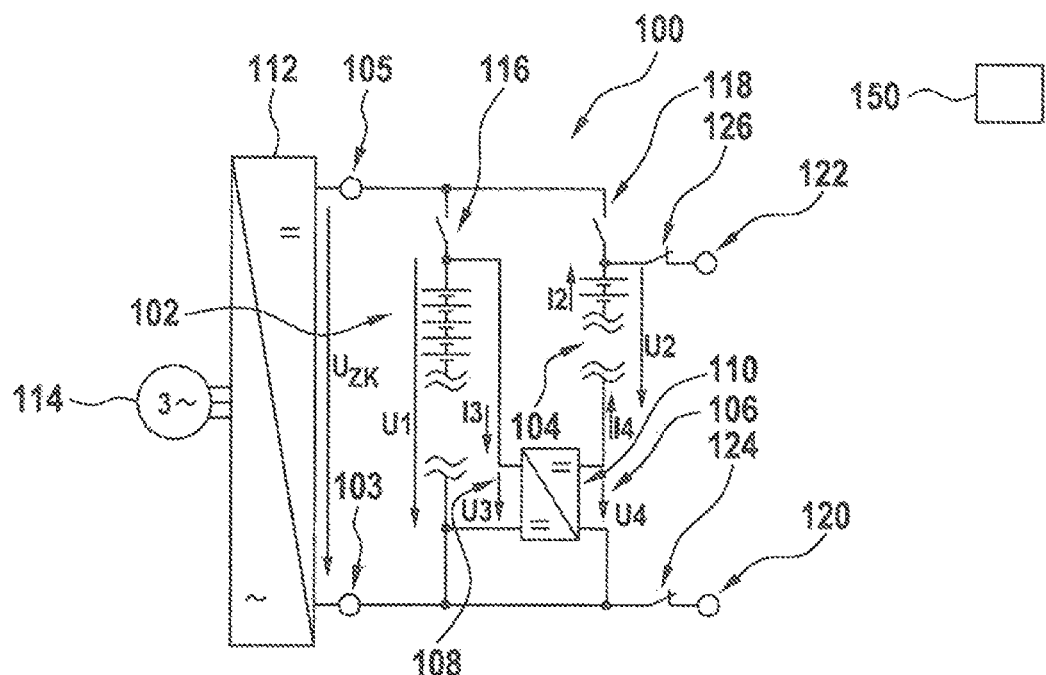
FIG. 3 is a schematic diagram of the operation of the current source arrangement according to an embodiment of the invention in a third operating situation.

Reference is made to FIG. 3, which shows a third operating situation in which the first current source 102 and the second current source 104 of the current source arrangement 100 are charged. The structural design of the current source arrangement 100 shown in FIG. 3 corresponds to the design of the current source arrangements shown in FIGS. 1 and 2 such that the description of the structural design of the current source arrangement is not repeated for the sake of conciseness.

In the operating situation shown in FIG. 3, the first switch 116 and the second switch 118 are open and the first charging switch 124 and the second charging switch 126 are closed. A current I4 flows through the second terminal pair 110 of the DC/DC converter 106 and through the second current source 104 by way of charging terminals 120, 122. The current I4 through the second terminal pair 110 of the DC/DC converter 106 is equal to the current I2 through the second current source 104. The voltage U2 drops across the second current source 104. The voltage U4 drops across the second terminal pair 110 of the DC/DC converter 106. The sum of the voltage U2 dropped across the second current source 104 and the voltage U4 dropped across the second terminal pair 110 of the DC/DC converter 106 corresponds to the charging voltage, as can be output by a charging apparatus, for example.

The DC/DC converter 106 is controlled in such a way that the voltage U4 across the second terminal pair 110 of the DC/DC converter 106 is converted to a voltage U3 across the first terminal pair 108 of the DC/DC converter 106, wherein the current through the first terminal pair is regulated and wherein the current through the first terminal pair is regulated in such a way that the maximum charging voltage is not exceeded. The voltage U3 across the first terminal pair 108 of the DC/DC converter can be higher than the voltage U4 across the second terminal pair 110 of the DC/DC converter. The voltage U3 at the first terminal pair 108 of the DC/DC converter 106 corresponds to the voltage U1 at the first current source 102.

The charging power of a current source arrangement increases linearly with the voltage of the current source arrangement since charging apparatuses for electrically driven vehicles are generally operated in such a way that the maximum charging current is limited. The maximum current of the charging apparatus is therefore the limiting parameter. Since the first switch 116 and the second switch 118 are open, the voltage at the charging terminals 120, 122 can be higher than the permissible voltage at the inverter 112. Furthermore, the first current source 102 can be charged using a comparatively high voltage, as a result of which the charging power is increased and the time required for charging is reduced. The charging voltage of the current source arrangement 100 is preferably regulated in such a way that the maximum charging voltage of the charging column is achieved.

In the embodiments shown in FIGS. 1 to 3, the first current source 102 can have a series circuit of rechargeable battery cells, for example lithium-ion cells, which are optimized for a high capacitance (high-energy cells). The second current source 104 can have a plurality of rechargeable battery cells, for example lithium-ion cells, which are optimized for a high current output (high-power cells), or a supercapacitor.

Figure 4:
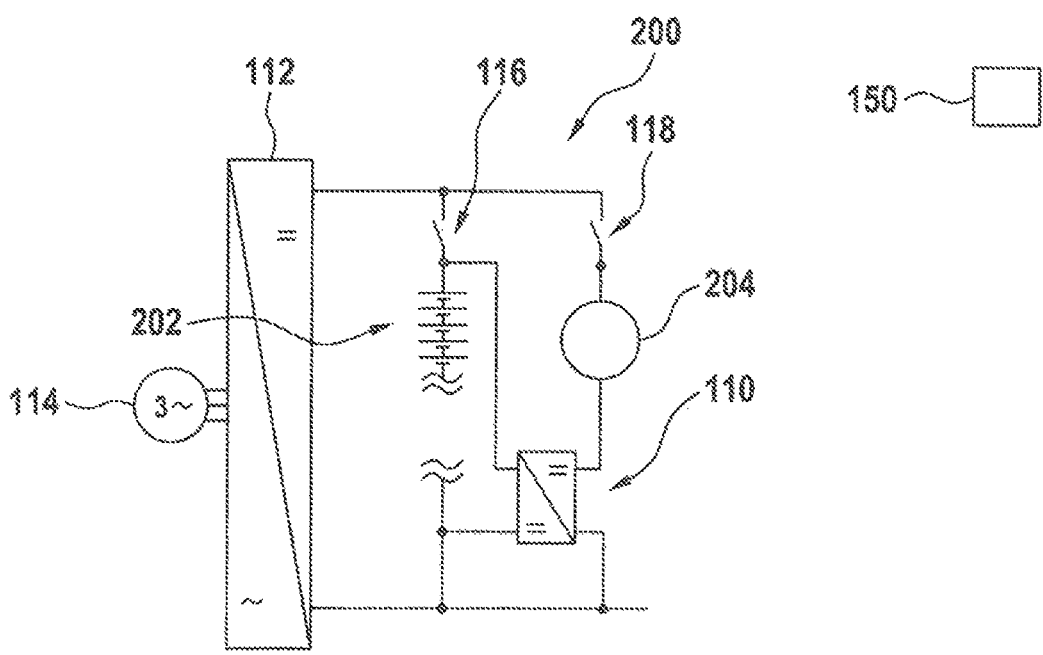
FIG. 4 shows an embodiment having a fuel cell.

Reference is made to FIG. 4, which shows a further embodiment of the invention. The embodiment of FIG. 4 corresponds in terms of structural design to the embodiments of FIGS. 1 to 3, except for the fact that the second current source 204 is a fuel cell. The first current source 202 can be an energy store optimized for a high power output, for example a supercapacitor and/or a series circuit of rechargeable battery cells, which are optimized for a high power output. This embodiment can be operated by means of the control device 150 in such a way as has been described above with reference to FIGS. 1 to 3.

On the one hand, the invention has the advantage that a DC/DC converter can be designed for a lower power. The invention furthermore has the advantage that a plurality of current sources can be operated in parallel or in series in order to better adjust the output current and/or the applied voltage to the operating point of an inverter having an electric machine. The charging at a current-limited charging apparatus can also be accelerated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A current source arrangement, comprising:
a first current source having a first terminal and a second terminal;
a second current source having a first terminal and a second terminal; and
a DC/DC converter, having a first terminal pair and a second terminal pair, wherein
the DC/DC converter is configured to convert a first DC voltage applied to the first terminal pair to a DC voltage output at the second terminal pair and/or to convert a first DC voltage applied to the second terminal pair to a DC voltage output at the first terminal pair;
the first terminal pair of the DC/DC converter is connected in parallel with the first current source,
the second terminal pair of the DC/DC converter is connected in series with the second current source, and
the second terminal pair of the DC/DC converter and the second current source are connected in parallel with the first current source,
the current source arrangement has a first terminal and a second terminal,
the first terminal of the first current source is coupled to the first terminal of the current source arrangement,
the second terminal of the first current source is coupled to the second terminal of the current source arrangement by a first switch,
the second terminal of the second current source is coupled to the second terminal of the current source arrangement by a second switch, and
the second terminal of the first current source is directly coupled to the second terminal of the second current source via the first and second switches.

2. The current source arrangement as claimed in claim 1, wherein
a first terminal of the first terminal pair of the DC/DC converter and a first terminal of the second terminal pair of the DC/DC converter have the same potential.

3. The current source arrangement as claimed in claim 1, wherein
the first terminal of the first current source is coupled to the first terminal of the first terminal pair of the DC/DC converter and to the first terminal of the second terminal pair of the DC/DC converter;
the second terminal of the first current source is coupled to the second terminal of the second current source and to the second terminal of the first terminal pair of the DC/DC converter; and
the second terminal of the second current source is coupled to the second terminal of the second terminal pair of the DC/DC converter.

4. The current source arrangement as claimed in claim 1, further comprising:
a first charging terminal, which is coupled to the first terminal of the second terminal pair of the DC/DC converter; and
a second charging terminal, which is coupled to the second terminal of the second current source.

5. The current source arrangement as claimed in claim 1, wherein
the first current source and/or the second current source have one or more of the following:
a rechargeable battery configured for a high capacitance;
a rechargeable battery configured for a high current output;
a capacitor;
a supercapacitor;
a series circuit of rechargeable battery cells;
a series circuit of rechargeable battery cells configured for a high capacitance;
a series circuit of rechargeable battery cells configured for a high current output; or
a fuel cell.

6. The current source arrangement as claimed in claim 1, further comprising:
a control device, which is configured to operate the current source arrangement so as to:
in a first operating situation, actuate the DC/DC converter, the first switch and the second switch such that the first switch and the second switch are closed and that a current flows through the first current source and through a load connected to the terminals of the current source arrangement, that a current flows through the first current source and through the first terminal pair of the DC/DC converter and that a current flows through the second current source and through the second terminal pair of the DC/DC converter and through the load connected to the terminals of the current source arrangement;
in a second operating situation, actuate the DC/DC converter, the first switch and the second switch such that the first switch is open and the second switch is closed and that a current flows through the first current source and through the first terminal pair of the DC/DC converter and that a current flows through the second current source and through the second terminal pair of the DC/DC converter and through the load connected to the terminals of the current source arrangement; and/or
in a third operating situation, actuate the DC/DC converter, the first switch and the second switch such that the first switch is open and the second switch is open and that a current flows through the charging terminals and through the second current source and through the second terminal pair of the DC/DC converter and that a current flows through the first terminal pair of the DC/DC converter and through the first current source.

7. An electric drive, comprising
an electric machine, which is connected to first terminals of an inverter; and
the current source arrangement as claimed in claim 1, wherein the current source arrangement is connected to second terminals of the inverter.

* * * * *